(12) United States Patent
Kraft et al.

(10) Patent No.: US 12,057,607 B2
(45) Date of Patent: Aug. 6, 2024

(54) ELECTROCHEMICAL DEVICE

(71) Applicant: ElringKlinger AG, Dettingen (DE)

(72) Inventors: Juergen Kraft, Metzingen (DE); Manuel Morcos, Tuebingen (DE)

(73) Assignee: ElringKlinger AG, Dettingen (DE)

( * ) Notice: Subject to any disclaimer, the term of this patent is extended or adjusted under 35 U.S.C. 154(b) by 965 days.

(21) Appl. No.: 16/999,203

(22) Filed: Aug. 21, 2020

(65) Prior Publication Data

US 2020/0381748 A1    Dec. 3, 2020

Related U.S. Application Data

(63) Continuation of application No. PCT/EP2019/053112, filed on Feb. 8, 2019.

(30) Foreign Application Priority Data

Feb. 23, 2018   (DE) ..................... 10 2018 104 172.1

(51) Int. Cl.
| | |
|---|---|
| *H01M 8/0258* | (2016.01) |
| *H01M 8/0228* | (2016.01) |
| *H01M 8/0273* | (2016.01) |
| *H01M 8/241* | (2016.01) |
| *H01M 8/2483* | (2016.01) |

(52) U.S. Cl.
CPC ....... *H01M 8/0258* (2013.01); *H01M 8/0228* (2013.01); *H01M 8/0273* (2013.01); *H01M 8/241* (2013.01); *H01M 8/2483* (2016.02)

(58) Field of Classification Search
None
See application file for complete search history.

(56) References Cited

U.S. PATENT DOCUMENTS

| | | | |
|---|---|---|---|
| 2016/0118673 A1* | 4/2016 | Andreas-Schott | H01M 8/0263 429/434 |
| 2017/0012301 A1* | 1/2017 | Kraft | H01M 8/241 |
| 2019/0088956 A1 | 3/2019 | Glueck et al. | |

FOREIGN PATENT DOCUMENTS

| | | |
|---|---|---|
| DE | 103 23 646 | 12/2004 |
| DE | 20 2015 104 972 | 1/2017 |

* cited by examiner

*Primary Examiner* — Daniel S Gatewood
(74) *Attorney, Agent, or Firm* — Womble Bond Dickinson (US) LLP

(57) ABSTRACT

An electrochemical device is provided, including a stack of a plurality of electrochemical units, at least one medium channel extending along a stack direction, at least one flow field via which a medium is able to flow transversely to the stack direction from the medium channel to another medium channel, and at least one connecting channel via which the flow field and the medium channel are in fluidic connection. The connecting channel has a medium channel-side mouth opening extending along a circumferential direction of the flow field from a first medium channel-side rim to a second medium channel-side rim, and a flow field-side mouth opening extending along the circumferential direction from a first to a second flow field-side rim. At least one of the flow field-side rims is offset away from the respective other flow field-side rim along the circumferential direction in relation to one of the medium channel-side rims.

7 Claims, 6 Drawing Sheets

ELECTROCHEMICAL DEVICE

CROSS-REFERENCE TO RELATED APPLICATIONS

This application is a continuation of international application number PCT/EP2019/053112, filed on Feb. 8, 2019, which claims the benefit of German application number 10 2018 104 172.1, filed on Feb. 23, 2018, which are incorporated herein by reference in their entirety and for all purposes.

FIELD OF DISCLOSURE

The present invention relates to an electrochemical device, which comprises the following:

a stack of a plurality of electrochemical units succeeding one another along a stack direction, which each comprise an electrochemically active membrane electrode arrangement, a bipolar plate, and a seal arrangement, at least one medium channel which extends along the stack direction through a plurality of the electrochemical units, at least one flow field by means of which a medium from the medium channel is able to flow transversely to the stack direction from the medium channel to another medium channel, and at least one connecting channel by means of which the flow field and the medium channel are in fluidic connection with each other, wherein the connecting channel has a medium channel-side mouth opening, which extends along a circumferential direction of the flow field from a first medium channel-side rim to a second medium channel-side rim, and a flow field-side mouth opening, which extends along the circumferential direction of the flow field from a first flow field-side rim to a second flow field-side rim.

BACKGROUND OF THE INVENTION

An electrochemical device of this kind is known from DE 10 2014 104 017 A1.

SUMMARY OF THE INVENTION

In accordance with an embodiment of the invention, an electrochemical device of the kind stated above is provided, in which a large volume flow of the fluid medium through the connecting channel can be achieved.

In accordance with an embodiment of the invention, an electrochemical device with the features of the preamble of Claim 1 is provided, wherein the first flow field-side rim of the flow field-side mouth opening is offset away from the second flow field-side rim of the flow field-side mouth opening along the circumferential direction of the flow field in relation to the first medium channel-side rim of the medium channel-side mouth opening, and/or
the second flow field-side rim of the flow field-side mouth opening is offset away from the first flow field-side rim of the flow field-side mouth opening along the circumferential direction of the flow field in relation to the second medium channel-side rim of the medium channel-side mouth opening.

As a result of this, everywhere across the through-flow direction of the connecting channel, there is a significantly large cross section which is configured to be flowed through for the flow supply of fluid medium to the flow field of the respective fluid medium or from the flow field of the respective fluid medium.

In particular, the region of the connecting channel facing towards the flow field or the chemically active part of the membrane electrode arrangement can be widened, whereby the pressure loss in the connecting channel is reduced.

By enlarging the flow field-side mouth opening of the connecting channel, more so-called gasports (through-openings for the passage of the fluid medium through a layer of the bipolar plate) can be flowed over out of the connecting channel, and/or the cross section of the gasport region that is configured to be flowed through by the fluid medium can be enlarged.

By offsetting a flow field-side rim of the flow field-side mouth opening relative to a medium channel-side rim of the medium channel-side mouth opening of the connecting channel, an offset between a flow field-side portion of the connecting channel and a medium channel-side portion of the connecting channel can be achieved, which allows for a greater degree of freedom in the design of the connecting channel.

The incident flow region from the connecting channel to the gasports can be widened. It is merely required that the connecting channels between separate media supply structures are brought down to the base level (e.g. the block region of the bipolar plate) in order to be able to introduce a fluid-tight seal, for example by means of a welding seam, in this intermediate region between two connecting channels, and thus to be able to mutually separate the fluid media guided in the two connecting channels.

The fluid medium guided in the medium channel, the connecting channel, and the flow field may in particular be a combustion gas, an oxidizing agent, or a cooling agent.

In a preferable embodiment of the invention, provision is made for the flow field-side mouth opening of the connecting channel to have a greater fluid passage area than the medium channel-side mouth opening of the connecting channel.

In a particular embodiment of the invention, the flow field-side mouth opening of the connecting channel opens at a corner region of the flow field. The present invention is particularly advantageous, in particular with the arrangement of the connecting channel at a corner region of the active area of the membrane electrode arrangement of an electrochemical unit, because without an offset between at least one flow field-side rim of the flow field-side mouth opening of the connecting channel and at least one medium channel-side rim of the medium channel-side mouth opening of the connecting channel, the flow field-side mouth opening would have a significantly smaller fluid passage area than the medium channel-side mouth opening of the connecting channel.

The connecting channel may be widened on two sides (on the flow field-side and on the medium channel-side) or only on one side (on the medium channel-side or, preferably, on the flow field-side) or only have an offset between the flow field-side mouth opening and the medium channel-side mouth opening along the circumferential direction of the flow field.

The first flow field-side rim of the flow field-side mouth opening of the connecting channel preferably has a smaller distance from the first medium channel-side rim of the medium channel-side mouth opening of the connecting channel than from the second medium channel-side rim of the medium channel-side mouth opening.

The second flow field-side rim of the flow field-side mouth opening of the connecting channel preferably has a smaller distance from the second medium channel-side rim of the medium channel-side mouth opening of the connecting channel than from the first medium channel-side rim of the medium channel-side mouth opening.

Preferably, the first medium channel-side rim of the medium channel-side mouth opening is connected to the first flow field-side rim of the flow field-side mouth opening by a first rim line, which forms a first lateral delimitation of the connecting channel, and the second medium channel-side rim of the medium channel-side mouth opening is connected to the second flow field-side rim of the flow field-side mouth opening by a second rim line, which forms a second lateral delimitation of the connecting channel.

In a particular embodiment of the invention, provision is made for the first rim line and/or the second rim line to be of stepped configuration.

This preferably results in a sudden change along the through-flow direction in the cross section of the connecting channel (fluid channel) that is configured to be flowed through.

In particular, provision may be made for the connecting channel to have a two-part structure and a medium channel-side portion and a flow field-side portion, wherein a sudden change in the cross section of the connecting channel that is configured to be flowed through occurs at the transition from the medium channel-side portion to the flow field-side portion of the connecting channel.

In particular, provision may be made for the first rim line to comprise a first medium channel-side rim line portion extending away from the first medium channel-side rim of the medium channel-side mouth opening substantially perpendicularly to the circumferential direction of the flow field (and substantially perpendicularly to the stack direction) and a first flow field-side rim line portion extending away from the first flow field-side rim of the flow field-side mouth opening substantially perpendicularly to the circumferential direction of the flow field (and perpendicularly to the stack direction),
and/or
for the second rim line to comprise a second medium channel-side rim line portion extending away from the second medium channel-side rim of the medium channel-side mouth opening substantially perpendicularly to the circumferential direction of the flow field (and perpendicularly to the stack direction) and a second flow field-side rim line portion extending away from the second flow field-side rim of the flow field-side mouth opening substantially perpendicularly to the circumferential direction of the flow field (and perpendicularly to the stack direction).

Alternatively or in addition to a stepped configuration of the first rim line and/or the second rim line, provision may also be made for the first rim line and/or the second rim line to extend obliquely to the circumferential direction of the respectively associated flow field, such that the cross section of the connecting channel that is configured to be flowed through continuously changes, in particular enlarges toward the flow field-side mouth opening of the connecting channel.

Supporting elements or supporting points in the connecting channel are not absolutely necessary.

The configuration of the connecting channel in accordance with the invention is preferably used together with a seal arrangement, which comprises separate sealing lines around at least one medium channel on the one hand and around the associated flow field on the other hand.

Preferably, a sealing line of the seal arrangement sealing the medium channel extends over a medium channel-side portion of the connecting channel and a sealing line of the seal arrangement sealing the flow field extends over a flow field-side portion of the connecting channel.

Due to the offset between the flow field-side rims of the flow field-side mouth opening of the connecting channel relative to the medium channel-side rims of the medium channel-side mouth opening of the connecting channel, the radius over the progression of the sealing line around the medium channel can remain large, which simplifies the seal design.

In a preferable embodiment of the invention, provision is made for the bipolar plate to comprise a plurality, preferably two, layers which, in the region of the medium channel-side mouth opening and the flow field-side mouth opening of the connecting channel, are spaced at a distance from each other at least in sections.

Preferably, the layers of the bipolar plate abut each other along a contact plane and at least one of the layers has a first medium channel-side ramp region adjoining the first medium channel-side rim of the medium channel-side mouth opening, a first flow field-side ramp region adjoining the first flow field-side rim of the flow field-side mouth opening, a second medium channel-side ramp region adjoining the second medium channel-side rim of the medium channel-side mouth opening, and/or a second flow field-side ramp region adjoining the second flow field-side rim of the flow field-side mouth opening, wherein the respective ramp region is inclined, preferably at an acute angle α, in relation to the contact plane.

Provision is preferably made for a layer of the bipolar plate to have at least one ramp region inclined in relation to the contact plane, which adjoins the same rim of a mouth opening of the connecting channel as a ramp region of the respective other layer of the bipolar plate inclined in relation to the contact plane.

The respective ramp region is preferably inclined in relation to the contact plane by an angle of at most 45°, in particular at most 30°, particularly preferably at most 20°, for example at most 10°.

Furthermore, the respective ramp region is preferably inclined in relation to the contact plane by an angle of at least 2°, in particular at least 3°.

Particularly preferably, associated with each ramp region of the one layer of the bipolar plate inclined in relation to the contact plane is a ramp region of the respective other layer of the bipolar plate which adjoins the same rim of a mouth opening of the connecting channel and is inclined in relation to the contact plane.

In order to ensure that the connecting channel remains open even after bracing the electrochemical units of the electrochemical device against each other, provision may be made for at least one supporting element to be arranged in the connecting channel between the two layers of the bipolar plate.

In particular, provision may be made for at least one of the layers of the bipolar plate to be provided with one or more supporting regions with which the respective layer of the bipolar plate is supported on the respective other layer.

Such a supporting region may be configured e.g. in the form of a round of oblong cup or a web.

Such a supporting region or a supporting element comprising such a supporting region is preferably formed in one piece with one of the layers of the bipolar plate.

Further features and advantages of the invention are the subject matter of the subsequent description and the illustrative depiction of an exemplary embodiment.

BRIEF DESCRIPTION OF THE DRAWINGS

The same or functionally equivalent elements are provided with the same reference numerals in all Figures.

DETAILED DESCRIPTION OF THE INVENTION

An electrochemical device, for example a fuel cell stack or an electrolyzer, shown in sections in FIGS. 1 to 6 and designated as a whole with 100, comprises a stack which comprises a plurality of electrochemical units 106, for example fuel cell units or electrolyzer units, succeeding one another in a stack direction 104, and a clamping device (not depicted) for applying the electrochemical unit with a clamping force directed along the stack direction 104.

Figure 2:
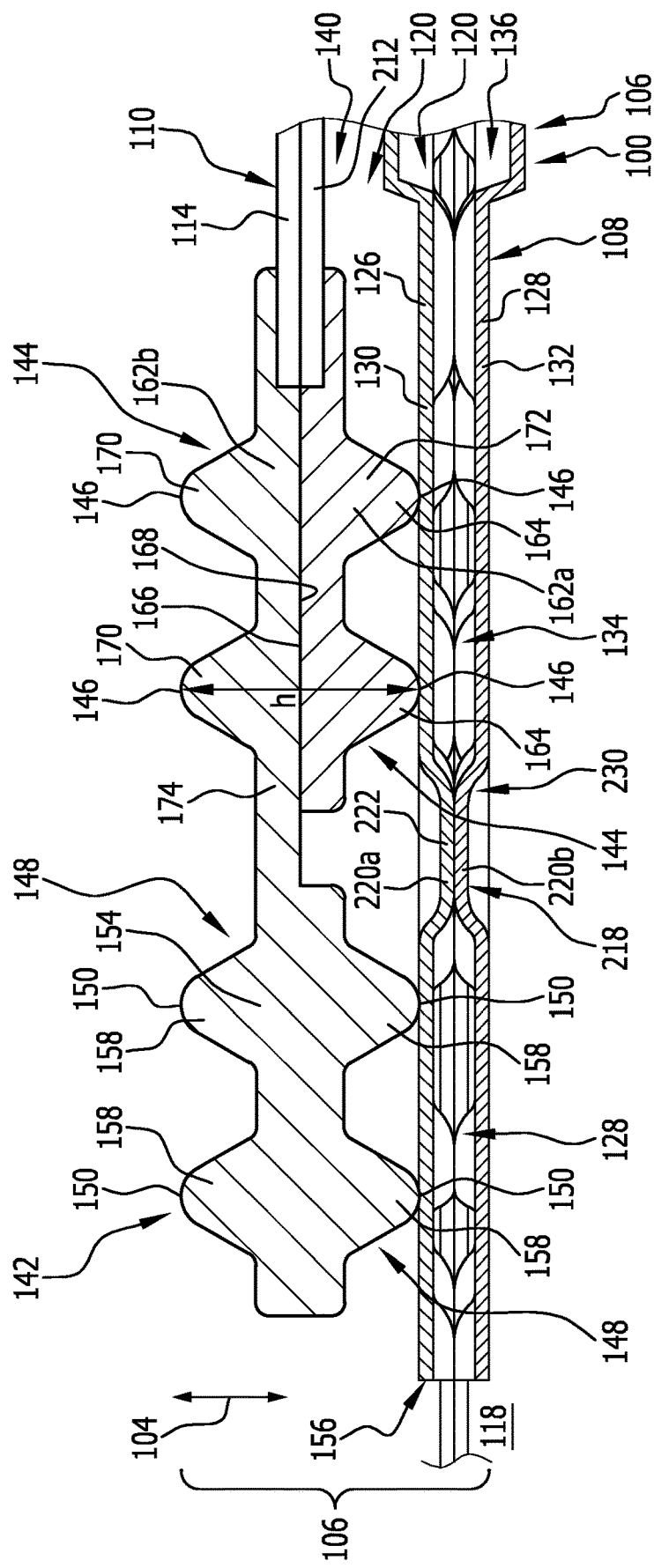
FIG. 2 shows a section through the connecting channel between a cooling agent medium channel and a cooling agent flow field of the electrochemical unit from FIG. 1, along the line 2-2 in FIG. 1.
Figure 3:
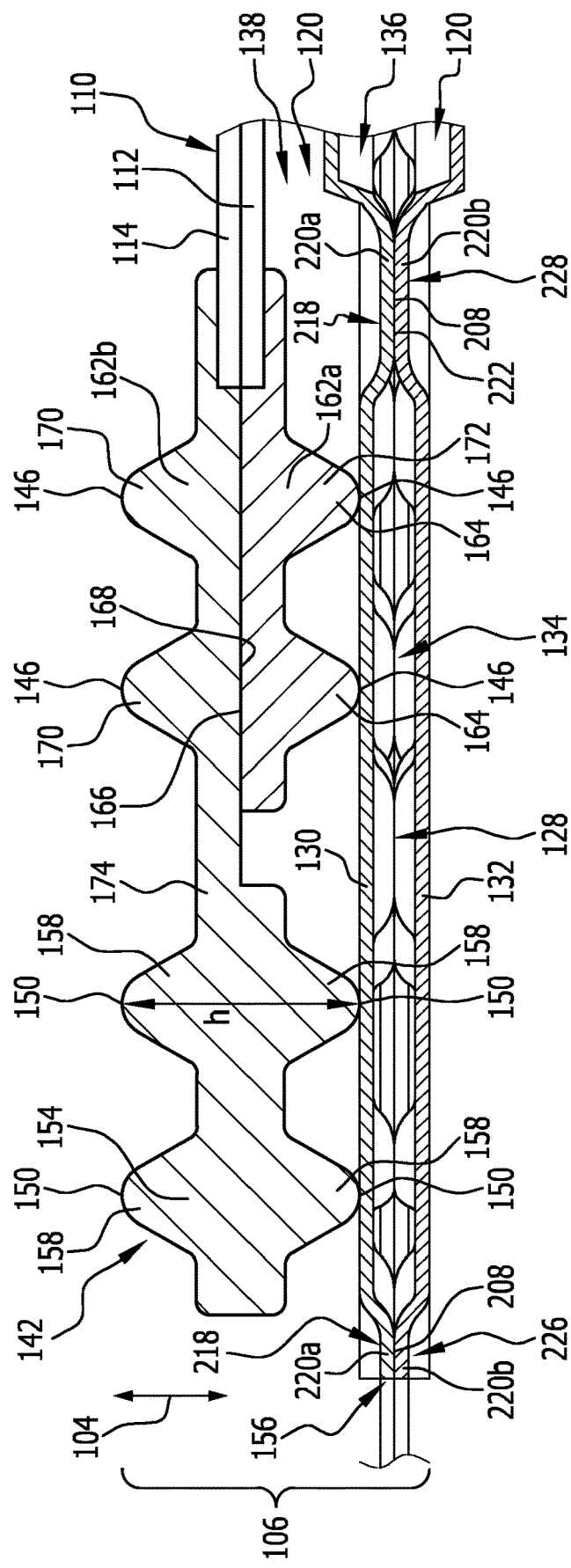
FIG. 3 shows a further section through the connecting channel between the cooling agent medium channel and the cooling agent flow field of the electrochemical unit from FIG. 1, along the line 3-3 in FIG. 1.

As can be seen best in FIGS. 2 and 3, each electrochemical unit 106 of the electrochemical device 100 comprises a respective bipolar plate 108 and a membrane electrode arrangement (MEA) 110.

The membrane electrode arrangement 110 comprises e.g. a catalyst-coated membrane (CCM) and two gas diffusion layers 112 and 114, wherein a first gas diffusion layer 112 is arranged on the anode side and a second gas diffusion layer 114 is arranged on the cathode side.

The bipolar plate 108 is formed e.g. of a metallic material.

The bipolar plate 108 has a plurality of medium passage openings 116, through which in case a fluid medium to be supplied to the electrochemical device 100 (in the case of a fuel cell stack e.g. a combustion gas, an oxidizing agent, or a cooling agent) is able to pass through the bipolar plate 108.

The medium passage openings 116 of the bipolar plates 108 succeeding one another in the stack and the interspaces located between the medium passage openings 116 in the stack direction 104 together each form a medium channel 118.

Each medium channel 118 by means of which a fluid medium is suppliable to the electrochemical device 100 is associated with at least one respective other medium channel by means of which the respective fluid medium is dischargeable from the electrochemical device 100.

By means of a flow field 120 located therebetween, which is preferably formed on a surface of an adjacent bipolar plate 108 or (for example in the case of a cooling agent flow field) in the interspace between the layers of a multi-layer bipolar plate 108, the medium is able to flow transversely, preferably substantially perpendicularly, to the stack direction 104 from the first medium channel 118 to the second medium channel.

Figure 1:
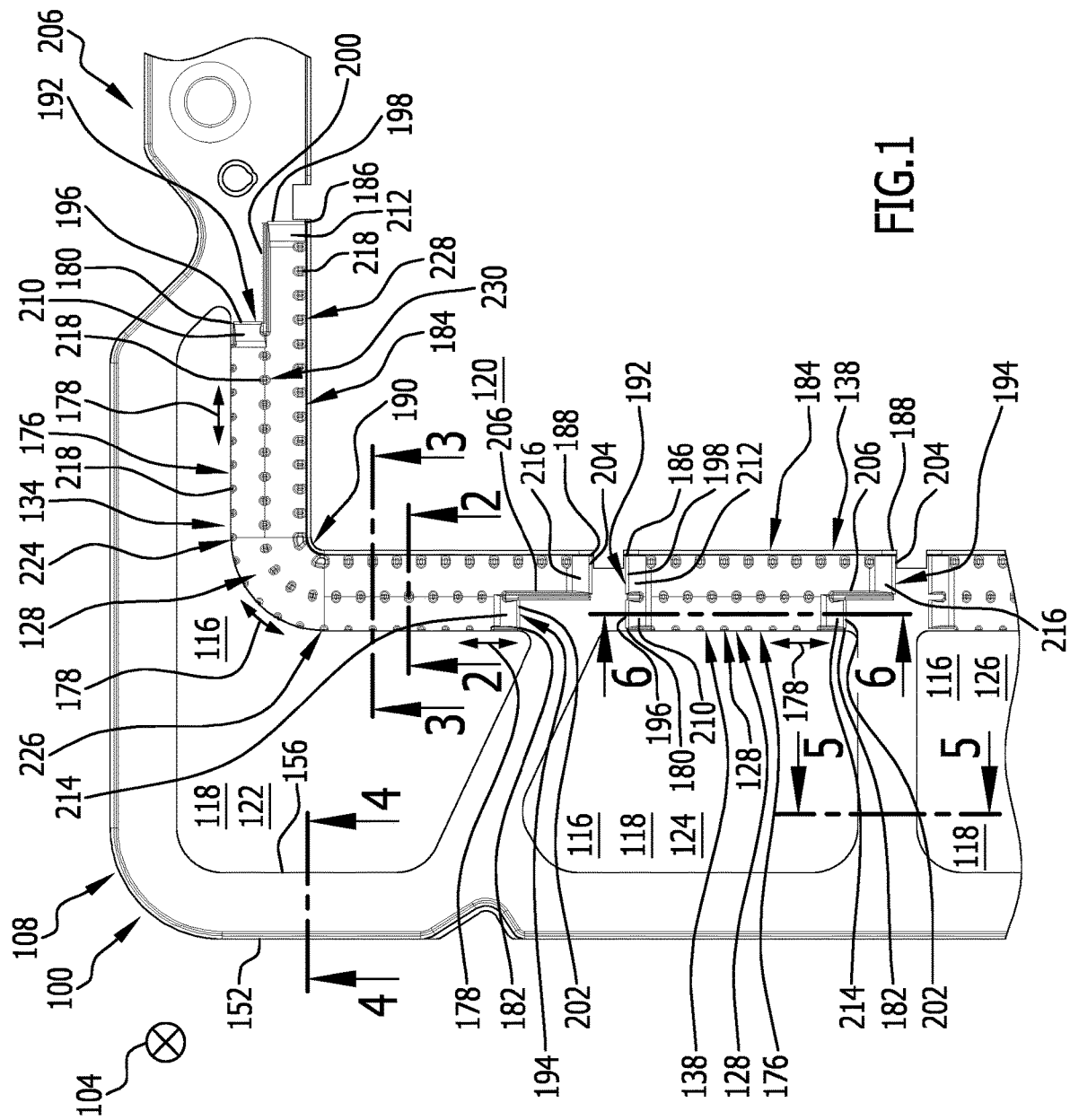
FIG. 1 shows a sectional plan view of an electrochemical unit of an electrochemical device comprising a plurality of electrochemical units succeeding one another along a stack direction, in the region of a combustion gas supply and a cooling agent supply.

Depicted in FIG. 1 is e.g. a medium channel 122 for a cooling agent of the electrochemical device 100, a medium channel 124 for a combustion gas of the electrochemical device 100, and a medium channel 126 for an oxidizing agent of the electrochemical device 100.

Each medium channel 118 is in fluidic connection with the respectively associated flow field 120 by way of a respective connecting channel 128.

In the embodiment depicted in the drawings, each bipolar plate 108 comprises a first layer 130 and a second layer 132 which are fixed to each other along connecting lines (not depicted) in a fluid-tight manner, preferably in a materially-bonded manner, in particular by means of welding, for example by means of laser welding.

As can be seen in FIG. 1, the medium channel 122 for cooling agent is in fluidic connection with a flow field 136 for the cooling agent by way of a connecting channel 134 for cooling agent, which is formed by an interspace between the first layer 130 and the second layer 132 of the bipolar plate 108, said flow field 136 being formed in the interspace between the first layer 130 and the second layer 132 of the bipolar plate 108.

As can further be seen in FIG. 1, the medium channel 124 for combustion gas is in fluidic connection with a flow field 140 for combustion gas by way of a connecting channel 138 for combustion gas, said flow field 140 being formed between the first layer 126 of the bipolar plate 108 and the first gas diffusion layer 112.

In order to guide the flow of the media through the respectively associated flow fields 120, the first layer 130 and the second layer 132 of the bipolar plate 108 are provided in the region of the flow fields 120 with flow guiding elements (not depicted) which may be configured e.g. in the form of raised beads.

An undesired escape of the fluid media from the media channels 118 and the flow fields 120 of the electrochemical device 100 is avoided by means of a seal arrangement 142.

The seal arrangement 142 comprises a flow field portion 144 with one or more, two in the embodiment depicted, sealing lines 146 which extend between the flow fields 120 on the one hand and the medium channels 118 on the other hand and cross the connecting channels 128 by means of which the flow fields 120 are in fluidic connection with the respectively associated medium channels 118.

Furthermore, the seal arrangement 142 comprises medium channel portions 148 with in each case one or more, in each case two in the graphically depicted embodiment, sealing lines 150 which each surround one of the medium channels 118 at least in sections and separate the respective medium channel 118 from the flow fields 120 and from an outer rim 152 of the bipolar plate 108.

The medium channel portions 148 of the seal arrangement 142 each comprise a sealing element 154 which is arranged between a first layer 130 of a bipolar plate 108 and a second layer 132 of a further bipolar plate (not depicted) adjacent in the stack direction 104 and extends substantially in parallel to the rim 156 of a medium passage opening 116 of the respective medium channel 118.

The sealing element 154 may be provided on each side with one or more sealing lips 158.

Figure 4:
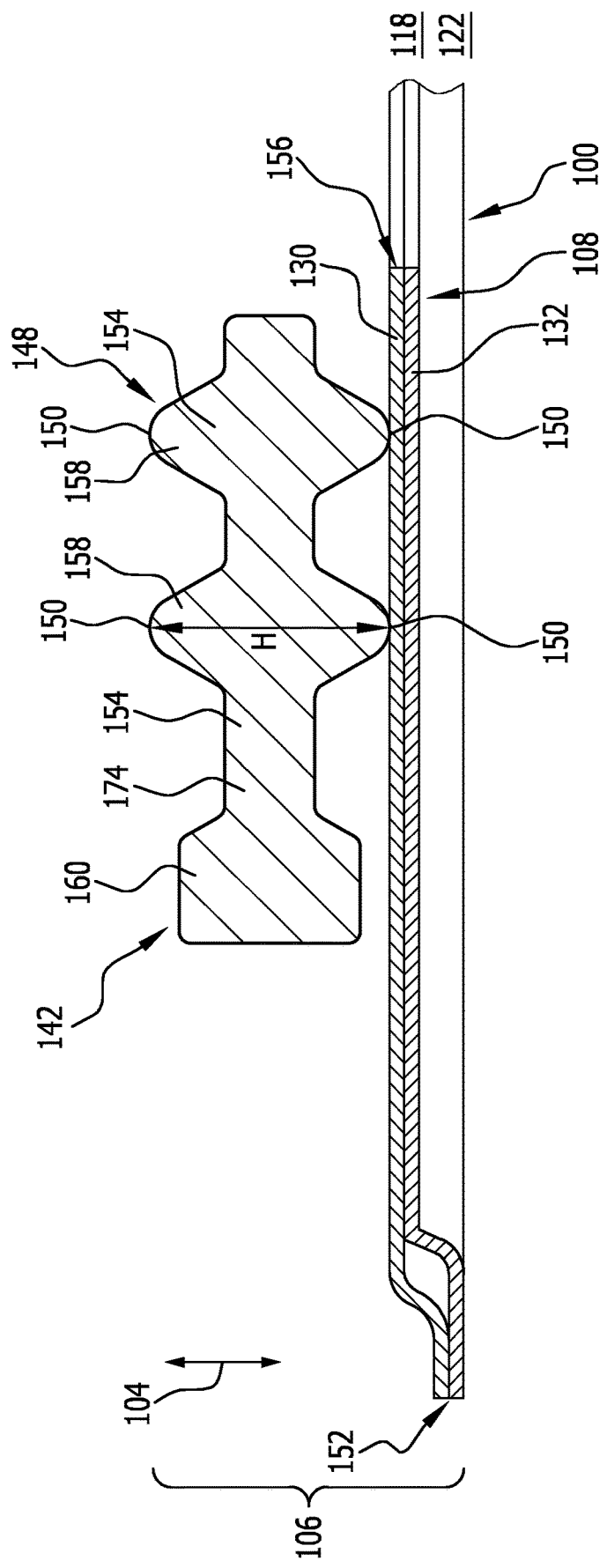
FIG. 4 shows a section through an outer rim region of the electrochemical unit from FIG. 1 in the region of the cooling agent medium channel, along the line 4-4 in FIG. 1.
Figure 5:
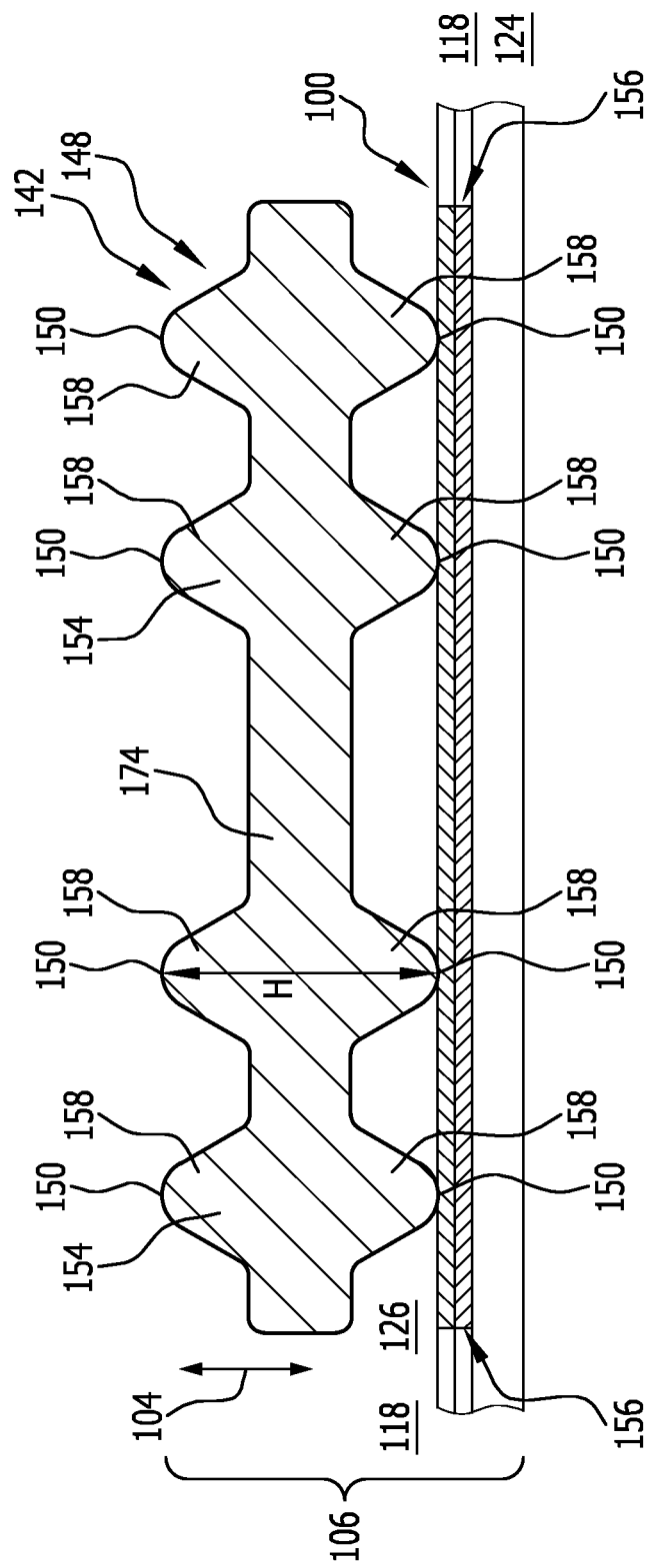
FIG. 5 shows a section through a web of the electrochemical unit from FIG. 1 between the combustion gas medium channel and an oxidizing agent medium channel, along the line 5-5 in FIG. 1.

On its rim facing the outer rim 152 of the bipolar plate 108, the sealing element 154 may be provided with a block region 160 (see FIG. 4).

The flow field portion 144 of the seal arrangement 142 preferably comprises two sealing elements 162a and 162b which are also arranged between the first layer 130 of the bipolar plate 108 and the second layer 132 of the adjacent bipolar plate.

The first sealing element 162a is hereby preferably fixed on the (preferably anode side) first gas diffusion layer 112 and the second sealing element 162b is preferably fixed on the (preferably cathode side) second gas diffusion layer 114 of the membrane electrode arrangement 110.

For example, provision may be made for the sealing elements 162a and 162b to be injection molded or cast onto the respectively associated gas diffusion layer 112 and 114, respectively.

Provision may hereby be made for the first sealing element 162a to have one or more sealing lips 164, which abut the first layer 130 of the bipolar plate 108 along the sealing lines 146, and to abut a preferably substantially planar delimiting face 168 of the second sealing element 162b with a likewise preferably substantially planar delimiting face 166, while the second sealing element 162b has one or more sealing lips 170 with which the sealing element 162b abuts the second layer 132 of the adjacent bipolar plate along the sealing lines 146 and abuts the delimiting face 166 of the first sealing element 162a with the preferably substantially planar delimiting face 168.

One of the sealing elements 162a, 162b, preferably the second sealing element 162b, may be formed in one piece with the sealing element 154 of at least one of the medium channel portions 148 of the seal arrangement 142.

The seal arrangement 142 may thus be formed in two pieces, wherein a first part 172 of the seal arrangement 142 comprises the first sealing element 162a of the flow field portion 144 and preferably is borne by the first gas diffusion layer 112, and wherein a second part 174 of the seal arrangement 142 comprises the second sealing element 162b of the flow field portion 144 and the sealing elements 154 of the medium channel portions 148 and preferably is borne by the second gas diffusion layer 114.

Because the first layer 130 and the second layer 132 of the bipolar plate 108 are spaced at a distance from each other in the region of a connecting channel 128 (see in particular FIGS. 2, 3, and 6), the sealing elements 162a, 162b and the sealing element 154 have in this region of the seal arrangement 142 a total height h which is less than the total height H of the seal arrangement 142 outside of the region of the connecting channels 128. The total height h and H, respectively, hereby corresponds to the sum of the individual heights of the first part 172 of the seal arrangement 142 and the second part 174 of the seal arrangement 142.

Each connecting channel 128 has a medium channel-side mouth opening 176, which extends along a circumferential direction 178 of the respectively associated flow field 120 from a first medium channel-side rim 180 to a second medium channel-side rim 182.

Furthermore, each connecting channel 128 has a flow field-side mouth opening 184, which extends along the circumferential direction 178 of the flow field 120 from a first flow field-side rim 186 to a second flow field-side rim 188.

As can be seen in FIG. 1, the first flow field-side rim 186 of the flow field-side mouth opening 184 of the connecting channel 134 for cooling agent is, in the graphically depicted embodiment, offset away from the second flow field-side rim 182 of the flow field-side mouth opening 184 of the connecting channel 134 for cooling agent along the circumferential direction 178 of the flow field 120 in relation to the first medium channel-side rim 180 of the medium channel-side mouth opening 176 of the connecting channel 134 for cooling agent, such that the flow field-side mouth opening 184 extends at its first flow field-side rim 186 along the circumferential direction 178 beyond the first medium channel-side rim 180 of the medium channel-side mouth opening 176.

Furthermore, the second flow field-side rim 188 of the flow field-side mouth opening 184 of the connecting channel 134 for cooling agent is, in this embodiment, offset away from the first flow-field side rim 186 of the flow field-side mouth opening 184 along the circumferential direction 178 of the flow field 120 in relation to the second medium channel-side rim 182 of the medium channel-side mouth opening 176 of the connecting channel 134 for cooling agent, such that the flow field-side mouth opening 184 of the connecting channel 134 for cooling agent extends at its second flow field-side rim 188 along the circumferential direction 178 of the flow field 120 beyond the second medium channel-side rim 182 of the medium channel-side mouth opening 176 of the connecting channel 134 for cooling agent.

The flow field-side mouth opening 184 of the connecting channel 134 for cooling agent therefore has a greater fluid passage area than the medium channel-side mouth opening 176 of the connecting channel 134 for cooling agent.

As can be seen in FIG. 1, the flow field-side mouth opening 184 of the connecting channel 134 for cooling agent opens at a corner region 190 of the associated flow field 120, namely the flow field 136 for cooling agent.

The first medium channel-side rim 180 of the medium channel-side mouth opening 176 of the connecting channel 134 for cooling agent is connected to the first flow field-side rim 186 of the flow field-side mouth opening 184 of the connecting channel 134 for cooling agent by a first rim line 192 which forms a first lateral delimitation of the connecting channel 134 for cooling agent.

The second medium channel-side rim 182 of the medium channel-side mouth opening 176 of the connecting channel 134 for cooling agent is connected to the second flow field-side rim 188 of the flow field-side mouth opening 184 of the connecting channel 134 for cooling agent by a second rim line 194 which forms a second lateral delimitation of the connecting channel 134 for cooling agent.

As can be seen in FIG. 1, both the first rim line 192 and the second rim line 194 are each of stepped configuration.

In particular, the first rim line 192 comprises a first medium channel-side rim line portion 196 extending away from the first medium channel-side rim 180 of the medium channel-side mouth opening 176 of the connecting channel 134 for cooling agent substantially perpendicularly to the circumferential direction 178 of the flow field 120 and perpendicularly to the stack direction 104, and a first flow field-side rim line portion 198 extending away from the first flow field-side rim 186 of the flow field-side mouth opening 184 of the connecting channel 134 for cooling agent substantially perpendicularly to the circumferential direction 178 of the flow field 120 and perpendicularly to the stack direction 104.

The first medium channel-side rim line portion 196 and the first flow field-side rim line portion 198 are connected to each other by a first central rim line portion 200 extending substantially in parallel to the circumferential direction 178 of the flow field 120.

The second rim line 194 comprises a second medium channel-side rim line portion 202 extending away from the second medium channel-side rim 182 of the medium channel-side mouth opening 176 of the connecting channel 134 for cooling agent substantially perpendicularly to the circumferential direction 178 of the flow field 120 and perpendicularly to the stack direction 104, and a second flow field-side rim line portion 204 extending away from the second flow field-side rim 188 of the flow field-side mouth opening 184 of the connecting channel 134 for cooling agent substantially perpendicularly to the circumferential direction 178 of the flow field 120 and perpendicularly to the stack direction 104.

The second medium channel-side rim line portion 202 is connected to the second flow field-side rim line portion 204 by a second central rim line portion 206 extending substantially in parallel to the circumferential direction 178 of the flow field 120.

Figure 6:
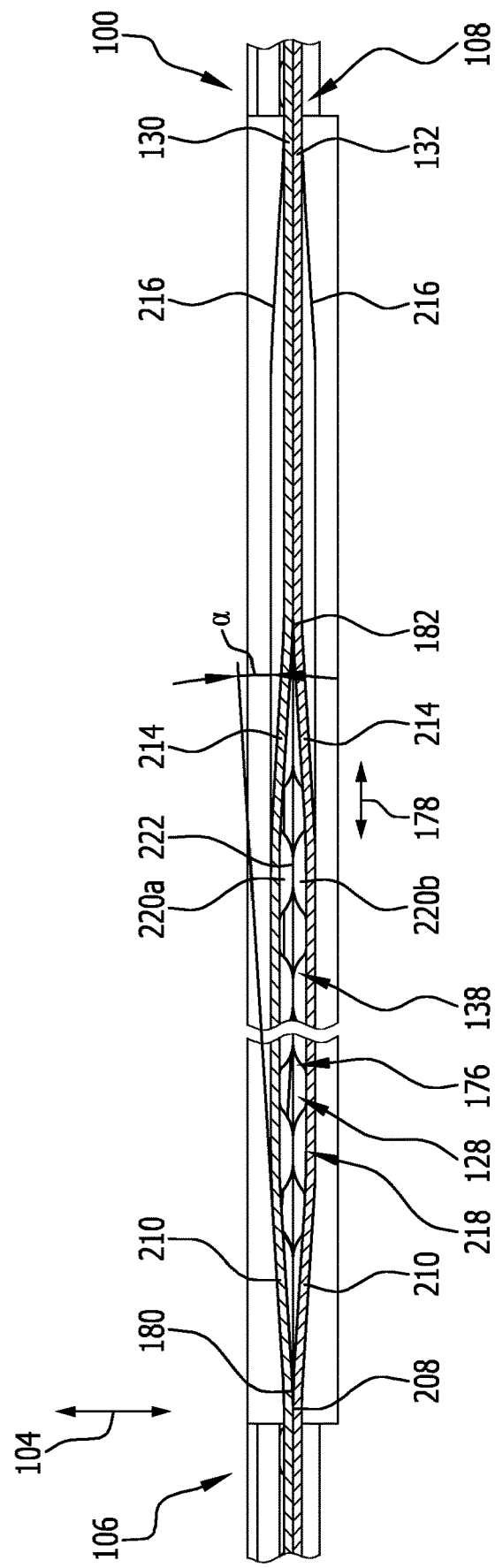
FIG. 6 shows a section through a medium channel-side region of a connecting channel between the combustion gas medium channel and the combustion gas flow field of the electrochemical unit from FIG. 1, along the line 6-6 in FIG. 1.

As can be seen in FIGS. 2, 3, and 6, the two layers 130 and 132 of the bipolar plate 108 abut each other along a contact plane 208 which is oriented perpendicularly to the stack direction 104.

In the graphically illustrated embodiment, each of the layers 130, 132 of the bipolar plate 108 comprises in each case a first medium channel-side ramp region 210 adjoining the first medium channel-side rim 180 of the medium channel-side mouth opening 176 of the connecting channel 134 for cooling agent, a first flow field-side ramp region 212 adjoining the first flow field-side rim 186 of the flow field-side mouth opening 184, a second medium channel-side ramp region 214 adjoining the second medium channel-side rim 182 of the medium channel-side mouth opening 176 of the connecting channel 134 for cooling agent, and a second flow field-side ramp region 216 adjoining the second flow field-side rim 188 of the flow field-side mouth opening 184 of the connecting channel 134 for cooling agent.

Each of the ramp regions 210, 212, 214, and 216 is hereby preferably of substantially planar configuration.

Each of the ramp regions 210, 212, 214, and 216 is preferably inclined by an angle of preferably at most 45°, in particular at most about 30°, particularly preferably at most about 20°, for example at most about 10°, in relation to the contact plane 208 of the layers 130, 132 of the bipolar plate 108.

Furthermore, each of the ramp regions 210, 212, 214, and 216 is preferably inclined by an angle of preferably at least about 2°, in particular at least about 3°, in relation to the contact plane 208 of the layers 130, 132 of the bipolar plate 108.

The ramp regions 210, 212, 214, and 216 of the first layer 130 of the bipolar plate 108 are hereby preferably arranged and configured substantially mirror-symmetrically to the ramp regions 210, 212, 214, and 216 of the second layer 132 of the bipolar plate 108 in relation to the contact plane 208.

As can further be seen in FIG. 1, the first flow field-side rim 186 of the flow field-side mouth opening 184 of the connecting channel 138 for combustion gas is, in the graphically depicted embodiment, not offset along the circumferential direction 178 of the flow field 120 in relation to the first medium channel-side rim 180 of the medium channel-side mouth opening 176 of the connecting channel 138 for combustion gas, such that the flow field-side mouth opening 184 ends at its first flow field-side rim 186 at the same position in relation to the circumferential direction 178 of the flow field 120 as the medium channel-side mouth opening 176.

The second flow field-side rim 188 of the flow field-side mouth opening 184 of the connecting channel 138 for combustion gas is, in this embodiment, offset away from the first flow-field side rim 186 of the flow field-side mouth opening 184 along the circumferential direction 178 of the flow field 120 in relation to the second medium channel-side rim 182 of the medium channel-side mouth opening 176 of the connecting channel 138 for combustion gas, such that the flow field-side mouth opening 184 of the connecting channel 138 for combustion gas projects at its second flow field-side rim 188 along the circumferential direction 178 of the flow field 120 beyond the second medium channel-side rim 182 of the medium channel-side mouth opening 176 of the connecting channel 138 for combustion gas.

The flow field-side mouth opening 184 of the connecting channel 138 for combustion gas therefore has a greater fluid passage area than the medium channel-side mouth opening 176 of the connecting channel 138 for combustion gas.

The first medium channel-side rim 180 of the medium channel-side mouth opening 176 of the connecting channel 138 for combustion gas is connected to the first flow field-side rim 186 of the flow field-side mouth opening 184 of the connecting channel 138 for combustion gas by a first rim line 192 which forms a first lateral delimitation of the connecting channel 138 for combustion gas.

The second medium channel-side rim 182 of the medium channel-side mouth opening 176 of the connecting channel 138 for combustion gas is connected to the second flow field-side rim 188 of the flow field-side mouth opening 184 of the connecting channel 138 for combustion gas by a second rim line 194 which forms a second lateral delimitation of the connecting channel 138 for combustion gas.

As can be seen in FIG. 1, the first rim line 192 of the connecting channel 138 for combustion gas is of substantially rectilinear configuration.

As can further be seen in FIG. 1, the second rim line 194 of the connecting channel 138 for combustion gas is of stepped configuration.

The first rim line 192 of the connecting channel 138 for combustion gas comprises a first medium channel-side rim line portion 196 extending away from the first medium channel-side rim 180 of the medium channel-side mouth opening 176 substantially perpendicularly to the circumferential direction 178 of the flow field 120 and perpendicularly to the stack direction 104, and a first flow field-side rim line portion 198 extending away from the first flow field-side rim 186 of the flow field-side mouth opening 184 of the connecting channel 138 for combustion gas substantially perpendicularly to the circumferential direction 178 of the flow field 120 and perpendicularly to the stack direction 104.

The first medium channel-side rim line portion 196 and the first flow field-side rim line portion 198 are configured substantially in alignment with each other.

The second rim line 194 of the connecting channel 138 for combustion gas comprises a second medium channel-side rim line portion 202 extending away from the second medium channel-side rim 182 of the medium channel-side mouth opening 176 of the connecting channel 138 for combustion gas substantially perpendicularly to the circumferential direction 178 of the flow field 120 and perpendicularly to the stack direction 104, and a second flow field-side rim line portion 204 extending away from the second flow field-side rim 188 of the flow field-side mouth opening 184 of the connecting channel 138 for combustion gas substantially perpendicularly to the circumferential direction 178 of the flow field 120 and perpendicularly to the stack direction 104.

The second medium channel-side rim line portion 202 is connected to the second flow field-side rim line portion 204 by a second central rim line portion 206 extending substantially in parallel to the circumferential direction 178 of the flow field 120.

In the graphically illustrated embodiment, each of the layers 130, 132 of the bipolar plate 108 in each case comprises a first medium channel-side ramp region 210 adjoining the first medium channel-side rim 180 of the medium channel-side mouth opening 176 of the connecting channel 138 for combustion gas, a first flow field-side ramp region 212 adjoining the first flow field-side rim 186 of the flow field-side mouth opening 184 of the connecting channel 138 for combustion gas, a second medium channel-side ramp region 214 adjoining the second medium channel-side rim 182 of the medium channel-side mouth opening 176 of the connecting channel 138 for combustion gas, and a second flow field-side ramp region 216 adjoining the second flow field-side rim 188 of the flow field-side mouth opening 184 of the connecting channel 138 for combustion gas.

Each of the ramp regions 210, 212, 214, and 216 of the layers 130, 132 of the bipolar plate 108 are hereby preferably of substantially planar configuration in the region of the connecting channel 138 for combustion gas.

As can be seen in FIG. 6, preferably each of the ramp regions 210, 212, 214, and 216 of the connecting channel 138 for combustion gas is inclined by an acute angle α of preferably at most 45°, in particular at most about 30°, particularly preferably at most about 20°, for example at most about 10°, in relation to the contact plane 208 of the layers 130, 132 of the bipolar plate 108.

Furthermore, each of the ramp regions 210, 212, 214, and 216 is inclined by an acute angle α of preferably at least about 2°, in particular at least about 3°, in the region of the connecting channel 138 for combustion gas in relation to the contact plane 208 of the layers 130, 132 of the bipolar plate 108.

The ramp regions 210, 212, 214, and 216 of the first layer 130 of the bipolar plate 108 are hereby preferably arranged and configured substantially mirror-symmetrically to the ramp regions 210, 212, 214, and 216 of the second layer 132 of the bipolar plate 108 in relation to the contact plane 208.

In the graphically depicted embodiment of an electrochemical device 100, the distance between the two layers 130 and 132 of the bipolar plate 108, which delimit a connecting channel 128, remains even when the electrochemical units 106 of the electrochemical device 100 are braced against each other in the stack direction 104, because one or preferably a plurality of supporting elements 218 are arranged in the respective connecting channel 128 between the two layers 130 and 132 of the bipolar plate 108.

In particular, provision may be made for such a supporting element 218 to comprise a supporting region 220*a* of the first layer 130 of the bipolar plate 108, said supporting region 220*a* projecting toward the second layer 132 of the bipolar plate 108, and/or to comprise a supporting region 210*b* of the second layer 132 of the bipolar plate 108, said supporting region 210*b* projecting toward the first layer 130 of the bipolar plate 108.

Such a supporting element 218 preferably comprises a supporting region 220*a* provided on the first layer 130 of the bipolar plate 108 and a supporting region 220*b* provided on the second layer 132 of the bipolar plate 108.

The supporting regions 220*a*, 220*b* hereby abut each other, preferably at a supporting face 222 aligned substantially in parallel to the contact plane 208 of the bipolar plate 108, such that the supporting regions 220*a*, 220*b* are supported on one another.

The supporting regions 220*a*, 220*b* may be configured e.g. in the form of knobs, cups, or webs.

The supporting regions 220*a*, 220*b* are preferably formed in one piece with in each case one of the two supporting layers 130, 132 of the bipolar plate 108 and preferably are formed by means of a forming process, in particular a stamping or deep drawing process, on the respective layer 130 or 132.

The fluid medium flowing through the connecting channel 128 preferably flows laterally past the supporting elements 218.

As can be seen best in FIG. 1, one or more rows 224 of connecting elements 218 may be provided in a connecting channel 128, for example in the connecting channel 134 for cooling agent or in the connecting channel 138 for combustion fuel, wherein each row 224 of supporting elements 218 comprises a plurality of supporting elements 218 succeeding one another along the circumferential direction 178 of the respectively associated flow field 120 and spaced at a distance from each other along the circumferential direction 178.

In particular, provision may be made for a medium channel-side row 226 of supporting elements 218 to be provided in the region of a connecting channel 128, which supporting elements 218 are arranged in the region of the medium channel-side mouth opening 176 of the connecting channel 128 and subdivide the medium channel-side mouth opening 176 into partial mouth openings succeeding one another along the circumferential direction 178.

Furthermore, a flow field-side row 228 of supporting elements 218 may be provided in the region of a connecting channel 128, which supporting elements 218 are arranged on the flow field-side mouth opening 184 of the connecting channel 128 and subdivide the flow field-side mouth opening 184 into partial mouth openings succeeding one another along the circumferential direction 178.

Furthermore, a central row 230 of supporting elements 218 may be provided in the region of a connecting channel 128, which supporting elements 218 are arranged between the medium channel-side mouth opening 176 and the flow field-side mouth opening 184 of the connecting channel 128, succeed one another along the circumferential direction 178 of the flow field 120, and are spaced at a distance from each other along the circumferential direction 178 of the flow field 120.

Preferably all supporting elements 218 of the central row 230 of supporting elements 218 have substantially the same distance from the medium channel-side mouth opening 176 of the connecting channel 128.

Furthermore, preferably all supporting elements 218 of the central row 230 of supporting elements 218 have substantially the same distance from the flow field-side mouth opening 184 of the connecting channel 128.

The distance of the supporting elements 218 of the central row 230 of supporting elements 218 from the medium channel-side mouth opening 176 may thereby be substantially equally as great as the distance of the supporting elements 218 of the central row 230 of supporting elements 218 from the flow field-side mouth opening 184; the distance of the supporting elements 218 of the central row 230 of supporting elements 218 from the medium channel-side mouth opening 176 may, however, be greater or smaller than the distance of the supporting elements 218 of the central row 230 of supporting elements 218 from the flow field-side mouth opening 184.

The supporting elements 218 of the different rows 224 of supporting elements 218 may have substantially the same size or different sizes.

As can be seen best in FIG. 1, provision may be made in particular for the supporting elements 218 of the medium channel-side row 226 of supporting elements 218 to have a smaller cross section (taken perpendicularly to the stack direction 104) than the supporting elements 218 of the central row 230 of supporting elements 218 and/or than the supporting elements 218 of the flow field-side row 228 of supporting elements 218.

The supporting elements 218 of the central row 230 of supporting elements 218 preferably have a cross section (taken perpendicularly to the stack direction 104) that is larger than the cross section (taken perpendicularly to the stack direction 104) of the supporting elements 218 of the medium channel-side row 226 of supporting elements 218 and/or is smaller than the cross section (taken perpendicularly to the stack direction 104) of the supporting elements 218 of the flow field-side row 228 of supporting elements 218.

The supporting elements 218 of the flow field-side row 228 of supporting elements 218 preferably have a cross section (taken perpendicularly to the stack direction 104) that is larger than the cross section (taken perpendicularly to the stack direction 104) of the supporting elements 218 of the medium channel-side row 226 of supporting elements 218 and/or is larger than the cross section (taken perpendicularly to the stack direction 104) of the supporting elements 218 of the central row 230 of supporting elements 218.

The connecting channel 128 is stabilized in the stack direction 104 by means of the supporting elements 218 supporting the connecting channel 128, such that the flow field-side mouth opening 184 of the connecting channel 128 and/or the medium channel-side mouth opening 176 of the connecting channel 128 can be enlarged and thus a greater volume flow of fluid medium through the connecting channel 128 can be achieved.

The pressure loss when flowing through the connecting channel 128 can hereby be reduced.

The invention claimed is:

1. Electrochemical device, comprising
a stack of a plurality of electrochemical units succeeding one another along a stack direction, which each comprise an electrochemically active membrane electrode arrangement, a bipolar plate, and a seal arrangement,
at least one medium channel which extends along the stack direction through a plurality of the electrochemical units,
at least one flow field by means of which a medium from the medium channel is able to flow transversely to the stack direction from the medium channel to another medium channel, and
at least one connecting channel by means of which the flow field and the medium channel are in fluidic connection with each other,
wherein the connecting channel has a medium channel-side mouth opening, which extends along a circumferential direction of the flow field from a first medium channel-side rim to a second medium channel-side rim, and
a flow field-side mouth opening, which extends along the circumferential direction of the flow field from a first flow field-side rim to a second flow field-side rim,
wherein
the first flow field-side rim of the flow field-side mouth opening is offset away from the second flow field-side rim of the flow field- side mouth opening along the circumferential direction of the flow field in relation to the first medium channel-side rim of the medium channel-side mouth opening,
and/or
the second flow field-side rim of the flow field-side mouth opening is offset away from the first flow field-side rim of the flow field-side mouth opening along the circumferential direction of the flow field in relation to the second medium channel-side rim of the medium channel-side mouth opening,
wherein the flow-field side mouth opening of the connecting channel has a greater fluid passage area than the medium channel-side mouth opening of the connecting channel,
wherein the first medium channel-side rim of the medium channel-side mouth opening is connected to the first flow field-side rim of the flow field-side mouth opening by a first rim line, which forms a first lateral delimitation of the connecting channel, and the second mediumchannel-side rim of the medium channel-side mouth opening is connected to the second flow field-side rim of the flow field-side mouth opening by a second rim line, which forms a second lateral delimitation of the connecting channel and
wherein the first rim line comprises a first medium channel-side rim line portion extending away from the first medium channel-side rim of the medium channel-side mouth opening substantially perpendicularly to the circumferential direction of the flow field and a first flow field-side rim line portion extending away from the first flow field-side rim of the flow field-side mouth opening substantially perpendicularly to the circumferential direction of the flow field,
and/or
the second rim line comprises a second medium channel-side rim line portion extending away from the second medium channel-side rim of the medium channel-side mouth opening substantially perpendicularly to the circumferential direction of the flow field and a second flow field-side rim line portion extending away from the second flow field-side rim of the flow field-side mouth opening substantially perpendicularly to the circumferential direction of the flow field,
wherein at least one of the first rim line and the second rim line is of stepped configuration.

2. The electrochemical device in accordance with claim 1, wherein the flow field-side mouth opening of the connecting channel opens at a corner region of the flow field.

3. The electrochemical device in accordance with claim 1, wherein the cross section of the connecting channel that is configured to be flowed through changes suddenly along the through-flow direction.

4. The electrochemical device in accordance with claim 1, wherein the bipolar plate comprises two layers which, in the region of the medium channel-side mouth opening and the flow field-side mouth opening of the connecting channel, are spaced at a distance from each other at least in sections.

5. The electrochemical device in accordance with claim 4, wherein the layers of the bipolar plate abut each other along a contact plane and wherein at least one of the layers has at least one of:
- a first medium channel-side ramp region adjoining the first medium channel-side rim of the medium channel-side mouth opening,
- a first flow field-side ramp region adjoining the first flow field-side rim of the flow field-side mouth opening,
- a second medium channel-side ramp region adjoining the second medium channel-side rim of the medium channel-side mouth opening, and
- a second flow field-side ramp region adjoining the second flow field-side rim of the flow field-side mouth opening,
- wherein the respective ramp region is inclined in relation to the contact plane.

6. The electrochemical device in accordance with claim 5, wherein a first layer of the bipolar plate has at least one ramp region inclined in relation to the contact plane, which adjoins the same rim of a mouth opening of the connecting channel as a ramp region of the other layer of the bipolar plate inclined in relation to the contact plane.

7. The electrochemical device in accordance with claim 4, wherein at least one supporting element is arranged in the connecting channel between the two layers of the bipolar plate.

* * * * *